United States Patent Office 2,956,040
Patented Oct. 11, 1960

2,956,040

FURFURAL-ALDEHYDE POLYCONDENSATION PRODUCTS WITH UNSATURATED HYDROCARBONS AND PROCESS OF MAKING

Karl Dietz, Kronberg (Taunus), and Guido Max Rudolf Lorentz, Frankfurt am Main, Germany, assignors to Farbwerke Hoechst Aktiengesellschaft vormals Meister Lucius & Brüning, Frankfurt am Main, Germany, a corporation of Germany No Drawing. Filed Aug. 16, 1957, Ser. No. 678,545

Claims priority, application Germany Aug. 18, 1956

6 Claims. (Cl. 260—41)

The present invention relates to a process of preparing synthetic resins on the basis of polycondensates of furfural and aldehydes, which resins are capable of being hardened in the cold or in the hot and are distinguished by their good resistance to chemical agents.

It is known that furfural can be subjected with aliphatic aldehydes to an aldol condensation. The condensation of furfural with acetaldehyde or another aldehyde at low temperatures, for example at temperatures up to 38° C., in the presence of small amounts of alkali yields defined products such as furfuryl acrolein, furfuryl-$\alpha$-methyl-acrolein and furfuryl-$\alpha$-ethyl-acrolein. To this reaction there can be subjected all aldeydes containing a $CH_2$-group in $\alpha$-position to the aldehyde group. When, after the first strongly exothermic aldol reaction has subsided, the reaction is continued in an alkaline medium, preferably at temperatures ranging from 90 to 110° C., resinous products are obtained. Depending on the reaction conditions applied in each particular case there are thus obtained either defined compounds or products of higher degree of condensation having resin-like character. The last mentioned products may be reacted with formaldehyde and, after having been mixed with an appropriate filler, they may be used as cements for the laying and jointing of acid-proof materials. These products possess only a poor resistance to chemical agents as is the case with the resins obtained from furfural and acetone or by acid condensation of furfuryl alcohol and to which a filling agent has been added. Their chemical resistance is particularly poor with respect to nitric acid, even when exposed only temporarily, and to bleaching lye (sodium hypochlorite solutions).

Now we have found that the chemical resistance of resins obtained in known maner by alkaline condensation of furfural and aliphatic aldehydes, particularly acetaldehyde, butyraldehyde or mixtures of different aldehydes, can be improved to yield resins which are superior to the known compositions as regards their resistance to chemical agents, for example to solvents, such as ethanol, acetone, benzene or toluene, and particularly to oxidizing agents, for example nitric acid or bleaching lye (sodium hypochlorite solution) by reacting the furfural aldehyde condensation products preferably at a temperature of 110° to 170° C., with unsaturated hydrocarbons containing activated double bonds and/or easily movable hydrogen atoms and hardening the resulting products either in the hot, i.e. at a temperature within the range of about 60 to 120° C., preferably 85 to 95° C., or at room temperature, i.e. at about 20° C., in which case compounds of acid or alkaline reaction are to be added.

As unsaturated reactive hydrocarbons there may be used according to the invention, for example, cyclopentadiene, dicyclopentadiene, methylcyclopentadiene, divinylbenzene, other hydrocarbons with aromatic ring systems, such as styrene, methylstyrene, acenaphthene, 9,10-dihydro-anthracene, terpene hydrocarbons, such as $\beta$- or $\gamma$-terpinene, 3,8-(9)-menthadiene, $\alpha$- or $\beta$-phellandrene, limonene and/or chloroprene. These compounds may be reacted per se or in admixture with one another with furfural-aldehyde condensate. The quantitative relation between said compounds and the condensate of furfural and aldeyde may vary within wide limits, the quantity of hydrocarbons used amounting advantageously to 10 to 90% by weight, preferably 10 to 50% by weight, of the condensate of furfural and aldehyde used.

The reaction of the aforesaid compounds with the polycondensates of furfural and aldehyde which may be designated as secondary condensation, may be carried out in the presence of 0.1 to 5% (calculated upon the total amount of reactants) of an appropriate condensing agent, such as zinc chloride, aluminum chloride, borofluoride or perchloric acid.

The resins obtained by the process of the invention may be mixed with appropriate inert fillers, such as coke dust, artificial graphite flour, silicon carbide, titanium dioxide, quartz, barium sulfate of appropriate grain size, fibrous fillers, such as asbestos and/or halogen-containing polymers, for example polyvinyl chloride, polyvinylidene chloride, chlorinated polyethylene, polytetrafluorethylene or polytrifluorchlorethylene, and also copolymers of, for example, vinyl acetate and vinyl chloride. When inorganic fillers are employed, 1 to 3 parts of filler are used per 1 part of resin. In the case of using polymers as fillers, 1 to 1.5 parts of polymer are advantageously used per 1 part of resin. To these fillers there is added, if desired, 1 to 10%, calculated upon the filler, of an acid hardener, for example sulfuric acid or an aromatic sulfonic acid, such as 1,5-naphthalene-disulfonic acid, or a sulfonic acid chloride, such as para-toluene-sulfochloride, so that the mixture can be hardened at room temperature.

Since the resins obtained by the process of the invention have aldehyde character even after the condensation, it is also possible to effect the hardening with 1 to 10%, calculated upon the filler, of an alkaline agent, for example sodium hydroxide or potassium hydroxide, the hydroxides of the alkaline earth metals or special aldehyde reagents, such as hydrazine.

The products obtained by the process of the invention are not only resistant to oxidizing agents but also to alkalies and solvents, which offers a particular technical advantage as regards their application in industry. These condensation resins, after having been mixed with an appropriate filler, may be used, for example, for the manufacture of cements, brickings and coatings resistant to acids, alkalies and solvents, or for preparing shaped bodies of various kind. They may further be used for preparing paints capable of being hardened in the cold or in the hot and containing, if desired, 1 to 10%, calculated upon the resin, of an appropriate hardener, for example phosphoric acid, primary ammonium phosphate or hydrochloric acid.

The following examples serve to illustrate the invention but they are not intended to limit it thereto.

*Example 1*

1 mol of furfural and 1 mol of freshly distilled acetaldehyde are mixed with one another and 0.01 mol of sodium hydroxide solution in the form of a 4% solution in a mixture of methanol and water is slowly added. When the exothermic reaction is terminated, the whole is heated for 3 hours under reflux and neutralized and the water is separated. The resulting product is heated for 2 hours at 130° C. with 0.25 mol of dicyclopentadiene. Any water that has formed is distilled off. The resin so obtained is mixed with an inert filler, for example a mixture of equal parts of quartz powder and graphite to which an acid hardener, for example paratoulene-sulfonic acid has previously been added, a mass of mortar-like consistency being obtained. The mass is made into cylinders which after an air-storage of 3 days are boiled for 8 hours with sodium hydroxide solution of 15% strength, concentrated hydrochloric acid, a mixture of equal parts of ethanol and acetone, nitric acid of 15% strength or concentrated bleaching lye. The loss in weight of the cylinders is below 0.5% when the boiling is effected with sodium hydroxide solution, hydrochloric acid or the solvent mixture. With the use of nitric acid the loss in weight amounts to 18% and in the case of bleaching lye it is at 1 to 2%. When the furfural-acetaldehyde condensation resin is modified with a relatively large amount of dicyclopentadiene, products are obtained which are distinguished by a considerably increased resistance as results from the considerably smaller losses in weight produced by oxidizing agents. In the case of unmodified furfuraldehyde condensates, the losses in weight produced by oxidizing agents are essentially greater.

*Example 2*

1 mol of furfural and 1 mol of freshly distilled butyraldehyde are mixed with one another and 0.01 mol of sodium hydroxide in the form of a 4% solution in a mixture of methanol and water is slowly added. When the exothermic reaction is terminated, the whole is heated for 3 hours under reflux and neutralized and the water is separated. The resulting product is heated for 2½ hours at 130 to 150° C. with 0.25 mol of dicyclopentadiene. Any water that has formed is distilled off. The resin so obtained is mixed, as described in Example 1, with an inert filler, for example a mixture of equal parts of quartz powder and graphite to which an appropriate hardener, for example para-toluene-sulfonic acid, has previously been added, so that a mass of mortar-like consistency is obtained. The mass is made into cylinders which after an air-storage of 3 days are exposed to the action of chemical agents as described in Example 1. The results obtained are very similar to those obtained in Example 1.

*Example 3*

1 mol of furfural is mixed with 0.9 mol of freshly distilled acetaldehyde and 0.1 mol of freshly distilled butyraldehyde and the whole is condensed as described in Examples 1 and 2 and aftertreated with dicyclopentadiene. The resin so obtained is mixed with an inert filler, for example coke powder, containing an acid hardener, for example naphthalene-disulfonic acid, so that a mass of mortar-like consistency is obtained. The mass is made into cylinders which after an air-storage of 3 days are exposed to the action of chemical agents as described in Example 1. The losses in weight of the cylinders are as follows:

| | Percent |
|---|---|
| Sodium hydroxide solution | 0.33 |
| Nitric acid | 7.46 |
| Bleaching lye | 1.2 |
| Mixture of equal parts of ethanol and acetone | 0.59 |
| Hydrochloric acid | 0.31 |

As results from the above table, the condensation of an aldehyde mixture carried out in accordance with the invention, leads to products of considerably improved chemical resistance.

*Example 4*

A condensate obtained as described in Example 1 is aftertreated while using, instead of dicyclopentadiene, 0.5 mol of γ-terpinene. The resin obtained is treated as described in Example 1 to yield a mass of mortar-like consistency. The mass is made into cylinders which after an air-storage of 3 days are distinguished by good chemical resistance which is similar to that obtained in Example 1, with the exception that the products are somewhat less resistant to solvent mixtures such as, for example, a mixture of spirit and acetone, than the products obtained in Example 1. When β-terpinene is used instead of gamma-terpinene, the cylinders prepared from the condensation product show practically the same properties.

*Example 5*

The process is carried out as described in Example 4 with the exception, however, that 3.8(9)-menthadiene or phellandrene is used instead of gamma-terpinene. The condensation products so obtained yield mortars of a good resistance to the action of chemical agents, especially sodium hydroxide solution and hydrochloric acid.

Compared with the mortars obtained in Example 1, they are somewhat less resistant to solvents such as a mixture of spirit and acetone, due to the fact that the hydrocarbons used in the present example are more ramified. The losses in weight do not, however, exceed 2%.

*Example 6*

When proceeding as described in Example 1 but using methylstyrene or divinylbenzene-(1,4) instead of dicyclopentadiene, cements of good chemical resistance are obtained. As compared with the preceding examples using terpenes, the products show a somewhat increased resistance to aromatic substances, i.e. in a test carried out with the use of mixtures of ethyl alcohol and toluene the loss in weight is only 1%.

*Example 7*

When proceeding as described in Example 1 but using acenaphthene or 9.10-dihydro-anthracene instead of dicyclopentadiene, there are obtained products of good resistance to the action of chemical agents, especially oxidizing agents such as bleaching lye or dilute nitric acid.

We claim:

1. The process for the production of hardenable synthetic resins which comprises reacting a condensation product obtained by alkaline condensation of furfural with a saturated aliphatic aldehyde containing a —$CH_2$— group in alpha position to the aldehyde group with 10 to 90% by weight, calculated upon the weight of said condensation product, of a member selected from the group consisting of cyclopentadiene, dicyclopentadiene, methylcyclopentadiene, divinyl benzene, styrene, methyl styrene, acenaphthene, 9,10-dihydroanthracene, beta-terpinene, gamma-terpinene, 3,8(9)-methadiene, alpha-phellandrene, beta-phellandrene and limonene, at a temperature within the range of about 110 to 170° C.

2. A process as defined in claim 1 wherein the reaction is carried out in the presence of a condensation catalyst selected from the group consisting of zinc chloride, aluminum chloride, boron trifluoride and perchloric acid.

3. A hardenable resin obtained by reacting a condensation product of furfural and a saturated aliphatic aldehyde containing a $CH_2$ group in alpha position to the aldehyde group with 10 to 90% by weight, calculated upon the weight of said condensation product, of an unsaturated hydrocarbon selected from the group consisting of cyclopentadiene, dicyclopentadiene, methylcyclopentadiene, divinyl benzene, styrene, methyl styrene, acenaphthene, 9,10-dihydroanthracene, beta-terpinene, gamma-terpinene, 3,8(9)-menthadiene, alpha-phellandrene, beta-phellandrene and limonene, at a temperature within the range of about 110 to 170° C.

4. A resin as defined in claim 3 containing from one to three parts by weight of an inert filler per one part by weight of resin.

5. A resin as defined in claim 3 containing from one to 1.5 parts by weight of a halogen-containing polymer per one part by weight of resin.

6. A resin as defined in claim 3 containing a halogen-containing polymer and up to about 10% by weight, calculated upon the weight of polymer, of a hardening agent selected from the group consisting of naphthalene disulfonic acid, para-toluene sulfochloride, alkali- and alkaline earth metal hydroxides, and hydrazine.

References Cited in the file of this patent

UNITED STATES PATENTS

| 1,933,715 | Day | Nov. 7, 1933 |

FOREIGN PATENTS

| 193,524 | Great Britain | Feb. 28, 1923 |

OTHER REFERENCES

Hackh's Chemical Dictionary, 2nd edition, 1937.